US010352053B2

(12) United States Patent
Krämer et al.

(10) Patent No.: US 10,352,053 B2
(45) Date of Patent: Jul. 16, 2019

(54) DEVICE FOR REPAIRING DAMAGE TO THE BOTTOM OF A CONTAINER FILLED WITH WATER

(71) Applicant: FRAMATOME GmbH, Erlangen (DE)

(72) Inventors: Georg Krämer, Wiesenttal (DE); Konrad Meier-Hynek, Herzogenaurach (DE)

(73) Assignee: FRAMATOME GMBH, Erlangen (DE)

( * ) Notice: Subject to any disclaimer, the term of this patent is extended or adjusted under 35 U.S.C. 154(b) by 203 days.

(21) Appl. No.: 15/034,440

(22) PCT Filed: Nov. 3, 2014

(86) PCT No.: PCT/EP2014/043544
§ 371 (c)(1),
(2) Date: May 4, 2016

(87) PCT Pub. No.: WO2015/067553
PCT Pub. Date: May 14, 2015

(65) Prior Publication Data
US 2016/0284432 A1    Sep. 29, 2016

(30) Foreign Application Priority Data
Nov. 5, 2013  (DE) .......................... 10 2013 112 136

(51) Int. Cl.
*E04G 23/02*    (2006.01)
*G21F 7/06*     (2006.01)
(Continued)

(52) U.S. Cl.
CPC ......... *E04G 23/0203* (2013.01); *B25J 11/005* (2013.01); *E04G 23/0218* (2013.01);
(Continued)

(58) Field of Classification Search
CPC .. G21F 7/06; G21F 9/22; B25J 11/005; E04G 23/0218; E04G 23/0203
See application file for complete search history.

(56) References Cited

U.S. PATENT DOCUMENTS 4,584,162 A * 4/1986 Yoli .................... B25B 27/0028
                                                      138/89
4,819,524 A    4/1989 Tolino
(Continued)

FOREIGN PATENT DOCUMENTS

CN      1275775 A     12/2000
CN    101802929 A      8/2010
(Continued)

OTHER PUBLICATIONS

International Application No. PCT/EP2014/073544 International Preliminary Report on Patentability dated May 19, 2016 (6 Pages).
(Continued)

*Primary Examiner* — Christopher T Schatz
(74) *Attorney, Agent, or Firm* — Keller Jolley Preece (57) ABSTRACT

A device for repairing damage to a bottom of a container filled with water is disclosed. The device comprises a guiding device, which can be placed on the bottom of the container and which has a centering device for centering the guiding device between wall sections of the bottom elements. The devices further comprises a fixing device for fixing the guiding device on the bottom of the container, a carrier, which can be guided along the guiding device and on which at least one pivot arm is arranged, and an accommodating element arranged at a free end of the pivot arm, for accommodating adhesive, with which part of a wall section of the bottom elements can be covered.

12 Claims, 9 Drawing Sheets

(51) Int. Cl.
    *G21F 9/04*     (2006.01)
    *G21F 9/22*     (2006.01)
    *B25J 11/00*     (2006.01)

(52) U.S. Cl.
    CPC ................ *G21F 7/06* (2013.01); *G21F 9/04* (2013.01); *G21F 9/22* (2013.01)

(56) References Cited

U.S. PATENT DOCUMENTS

| | | | |
|---|---|---|---|
| 6,219,399 B1 | 4/2001 | Naruse et al. | |
| 8,371,025 B2 | 2/2013 | Kramer et al. | |
| 2010/0192368 A1 | 8/2010 | Kramer et al. | |
| 2010/0242247 A1* | 9/2010 | Jones | B23P 6/00 |
| | | | 29/402.01 |
| 2013/0145594 A1 | 6/2013 | Krämer et al. | |

FOREIGN PATENT DOCUMENTS

| | | |
|---|---|---|
| CN | 202307165 U | 7/2012 |
| DE | 39 13 202 A1 | 10/1990 |
| DE | 3913202 A1 | 10/1990 |
| DE | 3916186 A1 | 11/1990 |
| DE | 694 04 121 T2 | 10/1997 |
| DE | 10 2008 014 544 A1 | 9/2009 |
| DE | 10 2012 205 013 A1 | 6/2013 |
| JP | 05-031591 | 9/1993 |
| JP | 2003-156586 A | 5/2003 |
| JP | 2009-066635 A | 4/2009 |
| RU | 2018985 C1 | 8/1994 |

OTHER PUBLICATIONS

Notice of Allowance as received in Russian application 2016122236 dated Aug. 3, 2018.

* cited by examiner

DEVICE FOR REPAIRING DAMAGE TO THE BOTTOM OF A CONTAINER FILLED WITH WATER

CROSS-REFERENCE TO RELATED APPLICATIONS

This application is a national phase entry under 35 U.S.C. § 371 of International Application No. PCT/EP2014/073544, filed Nov. 3, 2014, which claims the benefit of German Application No. 10 2013 112 136.5, filed Nov. 5, 2013. The entire contents of each of the foregoing patent applications are hereby incorporated by reference.

BACKGROUND OF THE INVENTION

1. Field of the Invention

Arrangement for repairing damage to the base of a container filled with water,

The invention relates to an arrangement for repairing damage to the base of a container filled with water.

2. Background and Relevant Art

Containers are used for storing, for example, radioactively contaminated water. Such containers usually have a container wall, a cover and a base, the latter being formed by a plurality of base elements joined together at least on two opposite sides with the aid of wall portions, which extend vertically into the container. These wall portions form a flange, at which the individual base elements are screwed together. Over time, these flange locations may be damaged, and the contaminated water can flow out of the container through said damaged locations. In order to avoid the environment of the container being contaminated by escaping water, it is therefore necessary to rectify the damage by sealing the damaged location. In order to be able to bring the adhesive to the damaged location, however, it would be necessary to let the water out of the container, but, for shielding or other reasons, this is not possible.

SUMMARY OF THE INVENTION

It is therefore an object of the present invention to specify an arrangement for repairing damage to the base of a container filled with water.

This object is achieved according to the invention by an arrangement having the features of patent claim 1. Accordingly, the arrangement comprises a guide arrangement, which can be placed on the base of the container. For this purpose, provision may be made for the guide arrangement to be able to be introduced into the container through an opening located on an upper side of the container.

The guide arrangement has a centering arrangement, which can center the guide arrangement between wall portions of the base elements. The guide arrangement also has a fixing arrangement, which can fix the guide arrangement on the base of the.

The arrangement comprises a carrier, which can be guided along the guide arrangement and on which at least one pivoting arm is arranged such that it can be pivoted between a transporting position, in which it is oriented perpendicularly to the plane of the base, and an operating position, in which it runs parallel to the plane of the base. The arrangement also comprises an accommodating element, which is arranged at a free end of the pivoting arm and is intended for accommodating adhesives, which can be used to cover over part of a wall portion of the base elements.

The arrangement according to the invention thus makes it possible for a region of the base, even a region located under water, to be repaired with adhesive by remote control. There is thus no need for the contaminated water to be let out. The guide arrangement can be used in order to move the carrier, on which the pivoting arm and the accommodating element are arranged, to the damaged location, and therefore, ultimately, the adhesive located in the accommodating element can seal the damage without a person having to enter into the interior of the container. In other words, the guide arrangement, in an operating position, forms a transporting route via which the adhesive can be transported to the damaged location from a site which can be accessed by a person.

In the case of a preferred embodiment of the invention, the guide arrangement is formed by a mast which, in an operating position, extends from the opening in the upper side of the container to the base of the latter.

If the mast is formed from a plurality of individual mast elements, it can be adapted to the desired dimensions, in particular heights, of the container which is to be repaired. Using a different number of mast elements and/or mast elements of different lengths allows the mast to be adapted individually to each specific case.

The centering arrangement preferably has two pivotable wings, on each of which are arranged fixing elements, which can be pushed against the wall portions.

In a preferred configuration of the invention, the fixing arrangement is formed by a magnet or a vacuum cup.

The operations of lowering the carrier and pivoting the pivoting arms can take place by means of a hoist.

In order that the carrier, with the pivoting arm and the accommodating element, can be guided through an opening that is as small as possible, the accommodating element is arranged such that it can be rotated between a transporting position, in which it is oriented perpendicularly to the plane of the base, and an operating position, in which it is oriented parallel to the plane of the base. In the transporting position, the accommodating element, which may be formed for example by an elongate U profile, is therefore in a vertical position, in which it can easily be moved through an opening. In order for the adhesive then to be positioned at the damaged location, it is only once it is located within the container that the accommodating element is rotated through 90° into a horizontal position, in which it is oriented parallel to the plane of the base of the container.

In order that the arrangement can be removed from the container again following the repair operation, the accommodating element can be released from the pivoting arm by means of an unlocking mechanism. The accommodating element and adhesive thus remain at the damaged location once repaired.

In order that different locations of the wall portions can be reached by the accommodating element and adhesive, the pivoting arm and accommodating element have arranged between them a movement element, by means of which the accommodating element, in the operating position, can be moved perpendicularly to the pivoting arm and to the guide arrangement, that is to say along the wall portions. The movement element is arranged on the pivoting arm such that it can be rotated preferably together with the accommodating element. The movement element is formed preferably by two telescopically movable rails.

In the case of a further preferred configuration of the invention, the arrangement additionally comprises a crane arrangement serving to support the guide arrangement, and all the other necessary components, and introduce these into the container and remove them therefrom. The crane arrangement here is configured such that it reduces to a desired amount the surface-area loading to which a cover provided is subjected by the arrangement. For this purpose, the crane arrangement may have, for example, a base plate, by means of which the weight of the arrangement as a whole is distributed over a certain surface area. It is also the case that the individual parts of the crane arrangement are of modular construction and can be dismantled into individual parts.

BRIEF DESCRIPTION OF THE DRAWINGS

In order to explain the invention further, reference is made to the exemplary embodiment illustrated in the figures, in which.

DETAILED DESCRIPTION

Figure 1:
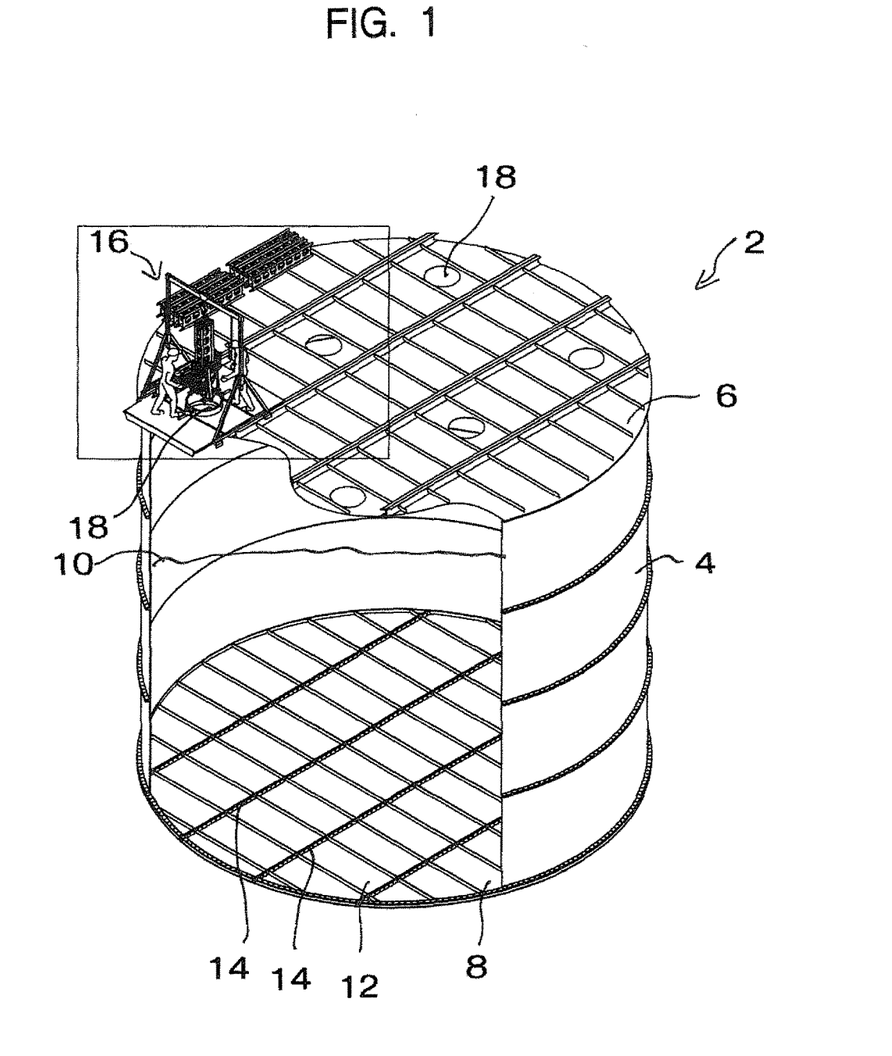
FIG. 1 shows a container with the arrangement according to the invention prior to being introduced into the container.

FIG. 1 shows a cylindrical container 2 having a side wall 4, a cover 6 and a base 8. The container 2 is filled with radioactively contaminated water 10.

The base 8 of the container is formed from a plurality of base elements 12, which are joined together on two opposite sides with the aid of wall portions 14, which extend vertically into the container 2. The respectively adjacent wall portions 14 of two neighboring base elements 12 here form a flange, which can be screw-connected by means of screws. It is at these flange locations in particular that damage occurs after the water 10 has been stored for a certain period of time, and it is necessary for said damage to be repaired and sealed so that it is not possible for any further contaminated water 10 to be able to run out of the container 2 into the environment surrounding the latter.

Figure 2:
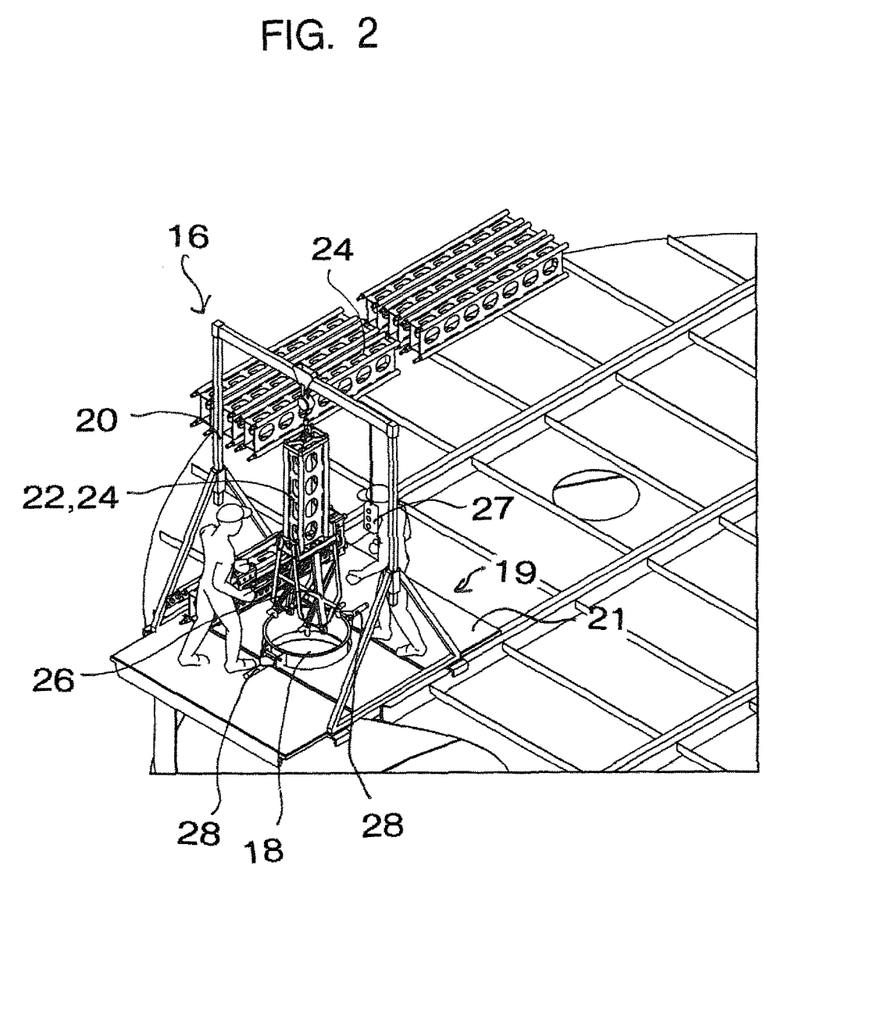
FIG. 2 shows a detail from FIG. 1 with the arrangement according to the invention.
Figure 3:
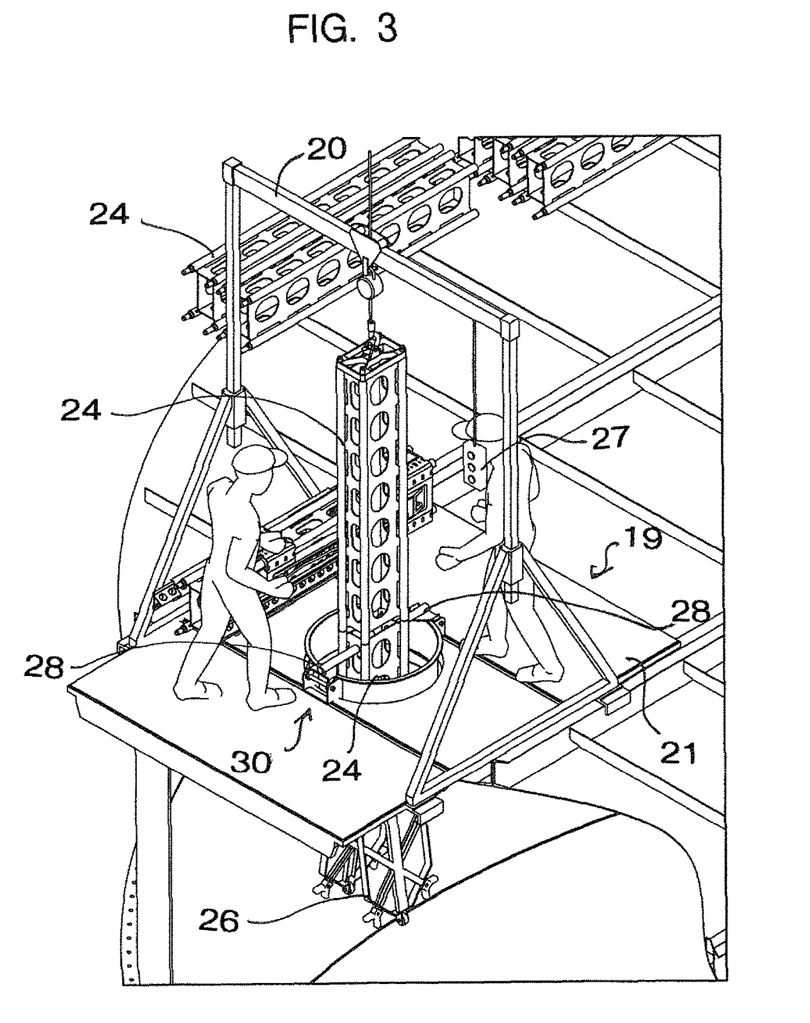
FIG. 3 shows the arrangement according to the invention as it is being lowered into the container.

For the purpose of repairing the damage, use is made of the arrangement 16 according to the invention, which is illustrated in FIGS. 1 and 2 in a state dismantled into individual parts. In order for it to be possible for the arrangement 16 to be introduced into the container 2, circular openings 18 have been made in the cover 6. Furthermore, a crane arrangement 19 has been arranged above an opening 18. Said crane arrangement comprises, in turn, a framework 20 and a base plate 21, which has been arranged on the upper side of the cover 6, around the opening 18. The crane arrangement 19 here is of modular construction, and it can therefore be dismantled into its individual components. The base plate 21 serves to distribute the weight of the arrangement 16 as a whole over a certain surface area in order thus to maintain a certain admissible surface-area loading for the cover, so that the latter is not dented by the weight. A first part of a guide arrangement 22, in the form of a mast element 24, is then fitted on the crane arrangement 19. The mast element 24 has, at the lower end, a centering arrangement 26. The mast element 24, with the centering arrangement 26, is then lowered into the container 2, through the opening 18, by means of the crane arrangement 19. The operation of introducing the arrangement 16 into the container 2 and the repair operation are controlled entirely by a control element 27. A retaining arrangement 30, which is formed by two bolts 28 which can be pivoted into the opening 18, retains the first mast element 24 in a temporary position as is illustrated in FIG. 3. The first mast element 24 can then have a further mast element 24 positioned on it, and connected to it, as is likewise illustrated in FIG. 3. It is then possible for any desired number of mast elements 24 to be assembled so that, in the operating position illustrated in FIG. 4, the guide arrangement 22 formed by the mast elements extends from the base 8 of the container 2 to above the opening 18.

Figure 4:
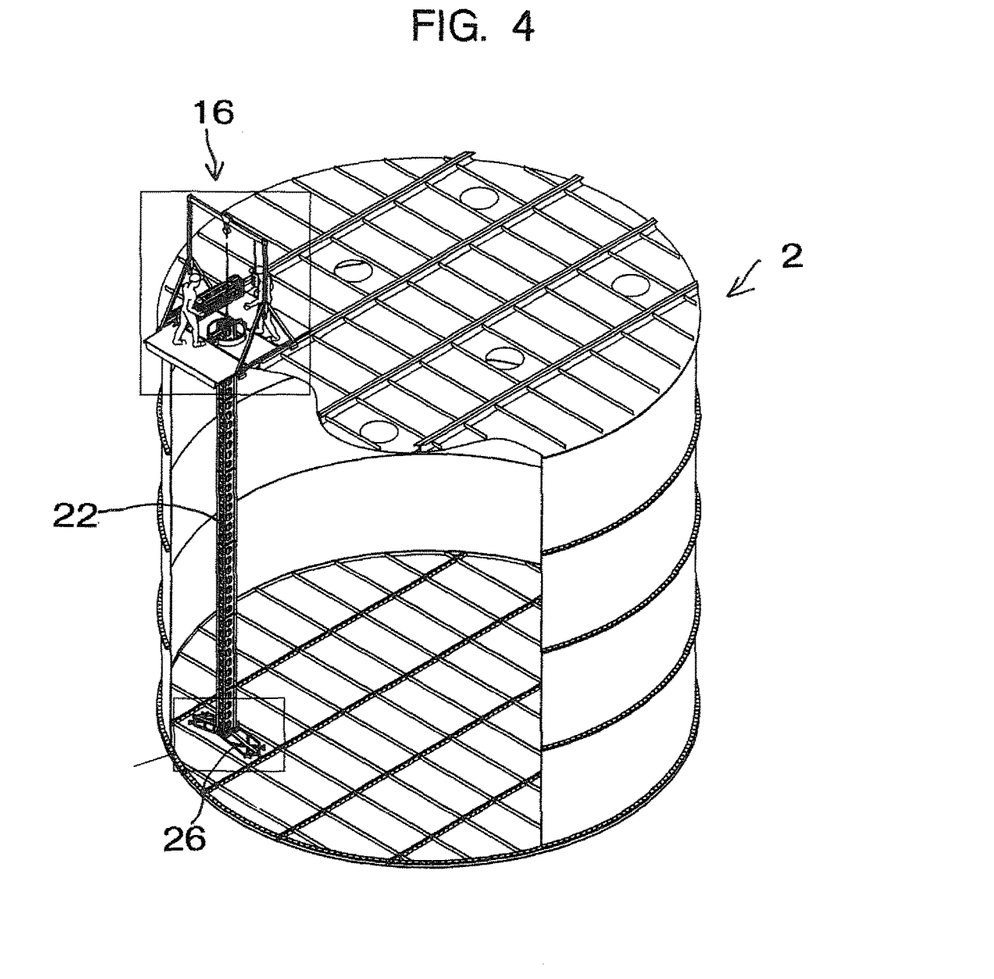
FIG. 4 shows the arrangement according to the invention during the centering operation.
Figure 5:
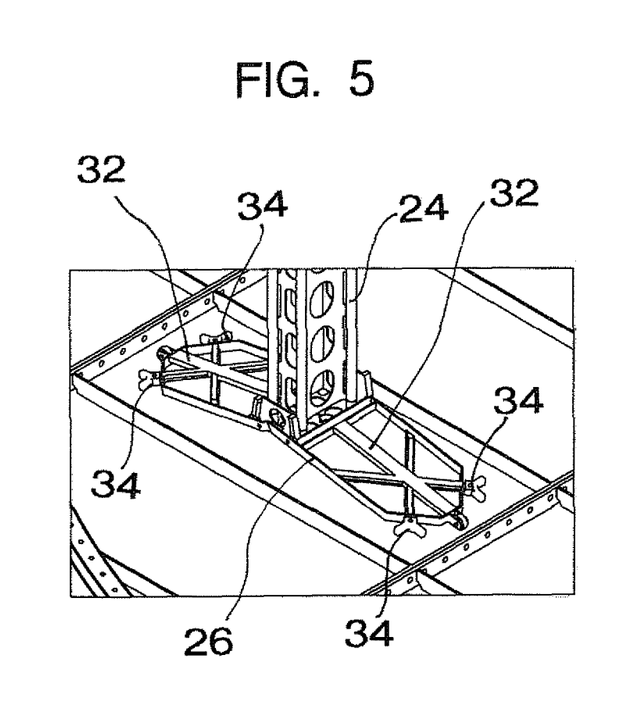
FIG. 5 shows a detail from FIG. 4 with the centering arrangement.

As lowering of the guide arrangement 22 continues, the centering arrangement 26 is the first to come into contact with the base 8 of the container 2, as is illustrated in FIGS. 4 and 5. In the exemplary embodiment illustrated, the centering arrangement 26 has two pivotable wings 32. These are pivoted open as a result of contact with the base 8, such that they are located parallel to the plane of the base 8.

Figure 6:
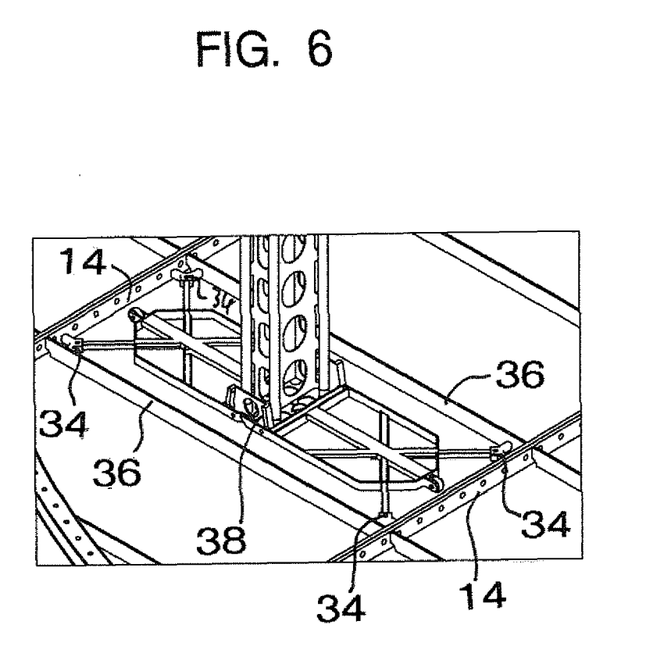
FIG. 6 shows the centering arrangement.

Each of the wings 32 of the centering arrangement 26 have arranged on them two fixing elements 34, which can be pushed against the wall portions 14, and further transverse struts 36, for example by means of hydraulics, pneumatics or a motor. Such a situation is illustrated in FIG. 6. By virtue of the individual fixing elements 34 being moved out symmetrically, the guide arrangement 22 is thus centered in relation to a base element 12. The guide arrangement 22 is thus arranged above the center point of the base element 12. In this position, the guide arrangement 22 is then fixed on the base 8 of the container 2 by a fixing arrangement 38. Such a fixing arrangement 38 may be formed, for example, by magnets or vacuum cups. The fixing elements 34 are then moved back again into their original position within the centering arrangement 26, so that they do not obstruct the rest of the repair operation.

Figure 7:
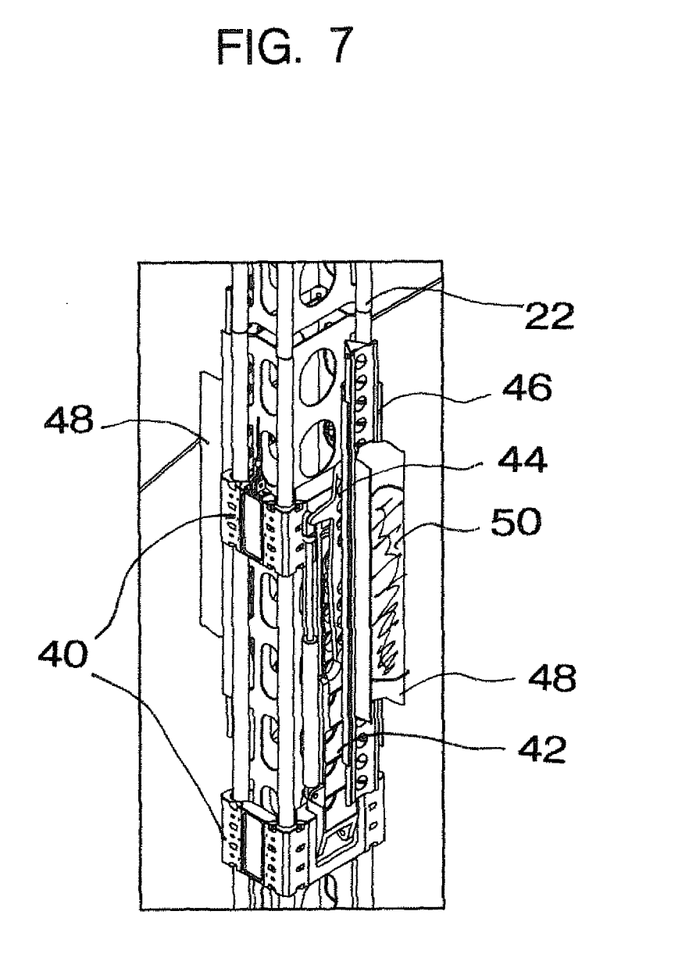
FIG. 7 shows a detail of the guide arrangement with the carrier and pivoting arms in a transporting position.
Figure 8:
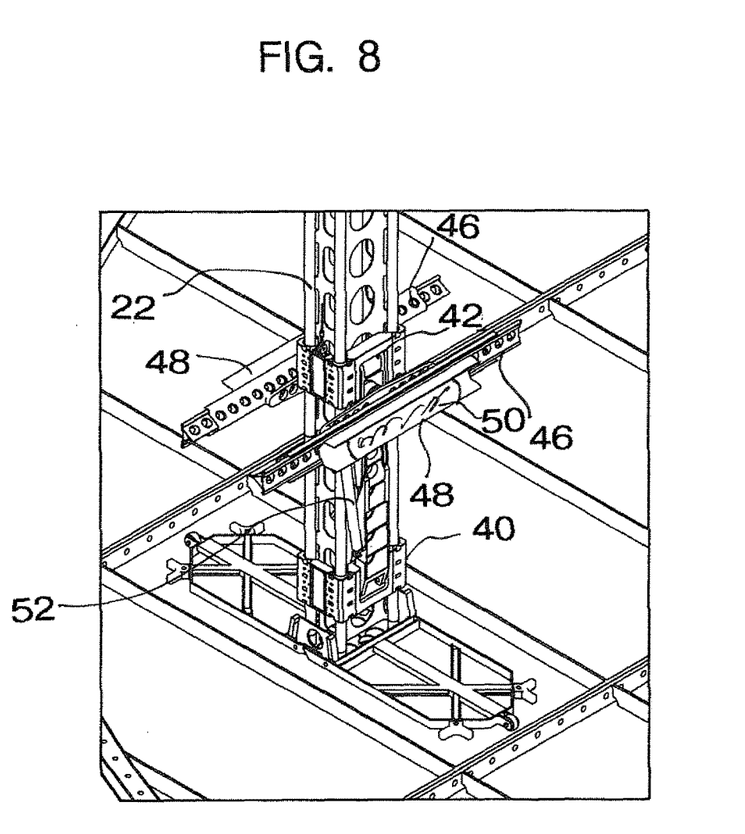
FIG. 8 shows the carrier, with pivoting arms and the accommodating element, in an operating position.

Next, a carrier 40 is lowered on the guide arrangement 22, said carrier being formed by two carriages and having arranged on it in this case two oppositely located pivoting arms 42, although only one can be seen in FIGS. 7 and 8.

Figure 9:
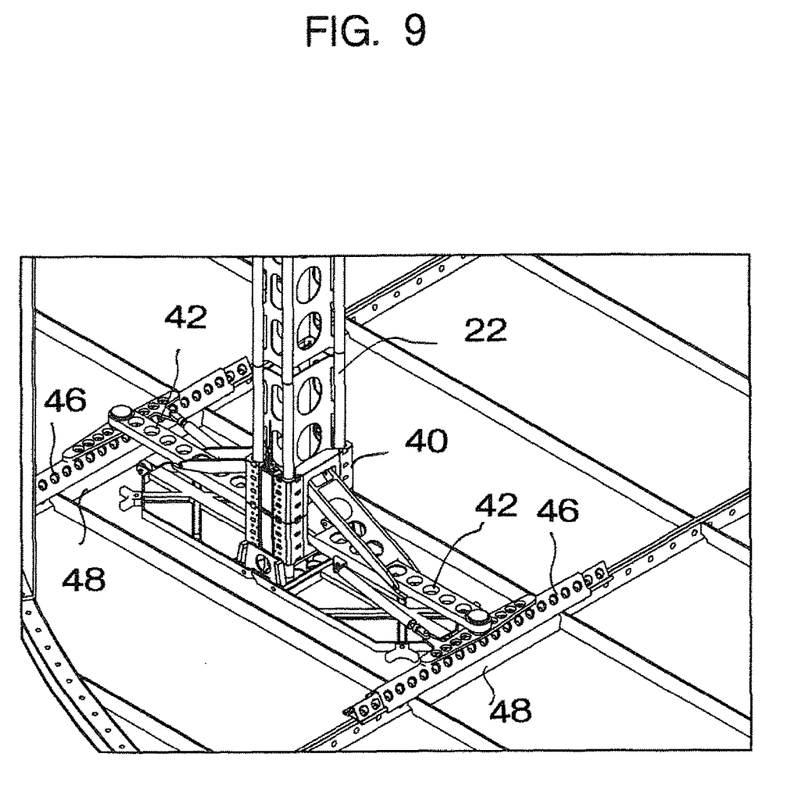
FIG. 9 shows the carrier with the pivoting arms pivoted out.

The pivoting arms 42 are arranged on the carrier 40 such that they can be pivoted between a transporting position, which is shown in FIGS. 7 and 8 and in which the two pivoting arms are oriented perpendicularly to the plane of the base, and an operating position, which is shown in FIG. 9 and in which the pivoting arms run parallel to the plane of the base 8. In addition, a movement element 46 in the form of two telescopically displaceable rails is arranged at the free end 44 of the pivoting arm 42, wherein one of the rails has arranged on it an accommodating element 48, which is in the form of a U profile and can accommodate adhesive 50.

In FIG. 7, both the pivoting arm 42 and the accommodating element 48, with the movement element 46, are located in a respective transporting position, in which they are oriented perpendicularly to the plane of the base 8. This makes it possible for the carrier 40, together with the pivoting arm 42 and the accommodating element 48, to be able to be introduced into the container 2 through the opening 18.

Once the carrier 40, with the pivoting arms 42 and the accommodating elements 48 provided with adhesive 50, has been introduced into the container 2, as is shown in FIG. 8, the movement element 46, together with the accommodating element, is rotated through 90° with the aid of a cylinder 52, so that it is located in an operating position, in which it runs parallel to the plane of the base 8. The pivoting arm 42 is then likewise pivoted into an operating position, in which it likewise runs parallel to the plane of the base 8, as is illustrated in FIG. 9. In this situation, the accommodating element 48 covers, and seals, the damaged location with adhesive 50. The accommodating element 48 is released from the movement element 46 by means of an unlocking mechanism, so that the pivoting arm 42 can be pivoted into the transporting position again. Conversely, it is then possible for the carrier 40, in turn, to be removed from the container 2 in the upward direction through the opening 18 by means of a hoist. It is likewise possible for the guide arrangement 22 to be drawn out of the container 2 and used for repair purposes at a further location.

The damaged location is thus repaired entirely by remote control, without anyone having to enter into the container 2. Furthermore, it is also the case that there is no need for the water 10 located in the container 2 to be let out.

The invention claimed is:

1. An arrangement for repairing damage to a base, formed by a plurality of base elements with wall portions, of a container filled with water, comprising:
   a guide arrangement comprising:
      a mast configured to be lowered into the container; and
      a centering arrangement secured to an end of the mast, the centering arrangement comprising:
         wings that are movably secured to the mast such that the wings move in operation between a first position parallel to the mast and a second position perpendicular to the mast,
         a plurality of fixing elements that selectably move symmetrically outward away from the mast and the wings so as to move the guide arrangement into a centered position between the wall portions of the base elements, and
         a fixing arrangement that selectably secures the guide arrangement in the centered position,
      a carrier, which can be guided along the guide arrangement and on which at least one pivoting arm is arranged such that it can be pivoted between a transporting position, oriented parallel to the mast, and an operating position, running perpendicular to the mast, and
      an accommodating element, which is arranged at a free end of the at least one pivoting arm and is configured to accommodate adhesive to be applied to the base.

2. The arrangement as claimed in claim 1, wherein the mast is elongatable.

3. The arrangement as claimed in claim 2, in which the mast is formed from a plurality of mast elements.

4. The arrangement as claimed in claim 1, wherein the wings comprise two pivotable wings.

5. The arrangement as claimed in claim 1, in which the fixing arrangement comprises a magnet or a suction cup.

6. The arrangement as claimed in claim 1, which comprises a hoist for lowering the carrier pivoting the at least one pivoting arm.

7. The arrangement as claimed in claim 1, in which the accommodating element is arranged such that it can be rotated between a transporting position, in which it is oriented parallel to the mast, and an operating position, in which it is oriented perpendicular to the mast.

8. The arrangement as claimed in claim 1, in which the accommodating element can be released from the at least one pivoting arm by means of an unlocking mechanism.

9. The arrangement as claimed in claim 1, in which the at least one pivoting arm and the accommodating element have arranged between them a movement element, by means of which the accommodating element, in an operating position, can be moved perpendicularly to the at least one pivoting arm and to the guide arrangement.

10. The arrangement as claimed in claim 1, which comprises a crane arrangement serving to support the guide arrangement and introduce it into the container and remove it therefrom.

11. The arrangement as claimed in claim 1, wherein the centering arrangement is sized and configured to center the guide arrangement between the wall portions of the base elements that extend vertically into the container and join together the base elements on opposite sides.

12. The arrangement as claimed in claim 1, wherein the guide arrangement can be introduced into the container through an opening located on an upper side of the container.

* * * * *